United States Patent

[11] 3,619,762

[72] Inventor Billy D. Pitchard
Springfield, Va.
[21] Appl. No. 34
[22] Filed Jan. 2, 1970
[45] Patented Nov. 9, 1971
[73] Assignee The Technical Material Corporation

[54] FREQUENCY RESPONSIVE ROTARY LINEAR AMPLIFIER FOR ALTERNATORS
8 Claims, 2 Drawing Figs.

[52] U.S. Cl. .......... 322/31, 322/32, 322/59
[51] Int. Cl. .......... H02p 9/30, H02p 9/42
[50] Field of Search .......... 322/29, 31, 32, 59

[56] References Cited
UNITED STATES PATENTS

| | | | |
|---|---|---|---|
| 3,164,769 | 1/1965 | Anderson .......... | 322/32 |
| 3,226,626 | 12/1965 | Moore .......... | 322/32 X |
| 3,375,433 | 3/1968 | Hagerty et al. .......... | 322/32 |

*Primary Examiner*—Oris L. Rader
*Assistant Examiner*—H. Huberfeld
*Attorney*—Colton & Stone

ABSTRACT: Output signals from high-frequency alternators are stabilized by a quadrature mixing process. A plurality of modulating signals are applied to the fields of an alternator in such a fashion as to cause the field flux to either rotate with or against the mechanical rotation of the rotor; the field modulating signals having a predetermined phase relationship and a frequency identical to the difference between the generated signal frequency and the desired output frequency.

INVENTOR
BILLY D. PRITCHARD
BY Colton & Stone
ATTORNEYS.

FREQUENCY RESPONSIVE ROTARY LINEAR AMPLIFIER FOR ALTERNATORS

BACKGROUND OF THE INVENTION

1. Field of the Invention

The present invention relates to the generation of high power electrical signals of a precise frequency. More particularly, the present invention is directed to the control of high-frequency alternators to thereby enable the generation of coherent, stable frequency, electrical energy. Accordingly, the general objects of the present invention are to provide novel and improved methods and apparatus of such character.

2. Description of the Prior Art

While not limited thereto in its utility, the present invention has been found to be particularly well suited for use in the stabilization of the output frequency of high-frequency communications alternators which are employed to generate very low frequency, hereinafter called VLF, signals. The generation of VLF signals for communications purposes was originally accomplished by means of rotary machinery. With time, various techniques for the stabilization of the output frequency from high-frequency communications alternators evolved; the most widely accepted control technique being the use of a high-gain closed-loop servosystem to control alternator shaft speed. Such closed-loop servosystems included means for sensing changes in shaft speed and for applying corrective action is response to speed errors. As a consequence of the efficiencies of such servo-loop loop controls, as will be briefly described below, the use of rotating machinery in communications systems has, for the most part, been abandoned in recent years in favor of solid-state systems employing silicon controlled rectifiers and high-power transistors. However, the solid state approaches to generating precise very low frequency signals for communications purposes have been characterized by relatively high expense, lack of reliability, and comparative complexity.

The aforementioned inherent deficiencies of servo-loop control systems include comparatively slow response time wherein the time it takes to sense and compensate for shaft speed errors is limited by the physical elements of the system and their inerta. Thus, servo-loop control systems for communications alternators have previously had, at best, an output stability of 0.01 percent in the operating frequency range of 10–30 kc.

SUMMARY OF THE INVENTION

The present invention overcomes the above discussed and other problems and disadvantages of the prior art and in so doing provides a rotary linear amplifier of unique and useful design. The apparatus of the present invention comprises an alternator and a control system therefor whereby alternator output signal amplitude and frequency are precisely maintained. The control system of the present invention does not attempt to regulate the mechanical speed of the alternator, as has been accomplished in the prior art, but rather stabilizes the alternator output signal by a quadrature mixing process wherein frequency is added to or subtracted from the generated signal to obtain the desired output frequency. Alternators used in accordance with the present invention are provided with a plurality of field windings and alternating currents of the proper phase and frequency are applied to the fields in such a manner as to cause the field flux to rotate with or against the mechanical rotation of the rotor. The control signals applied to the alternator fields are generated by a balanced modulator circuit which is responsive to an input signal from a reference source and also to signals commensurate with the instantaneous alternator output frequency; the modulator thus producing a field modulating frequency that is identical to the difference between the generated signal frequency and the desired output frequency.

BRIEF DESCRIPTION OF THE DRAWING

The present invention may be better understood and its numerous objects and advantages will become apparent to those skilled in the art by reference to the accompanying drawing wherein.

DESCRIPTION OF THE PREFERRED EMBODIMENT

Figure 1:
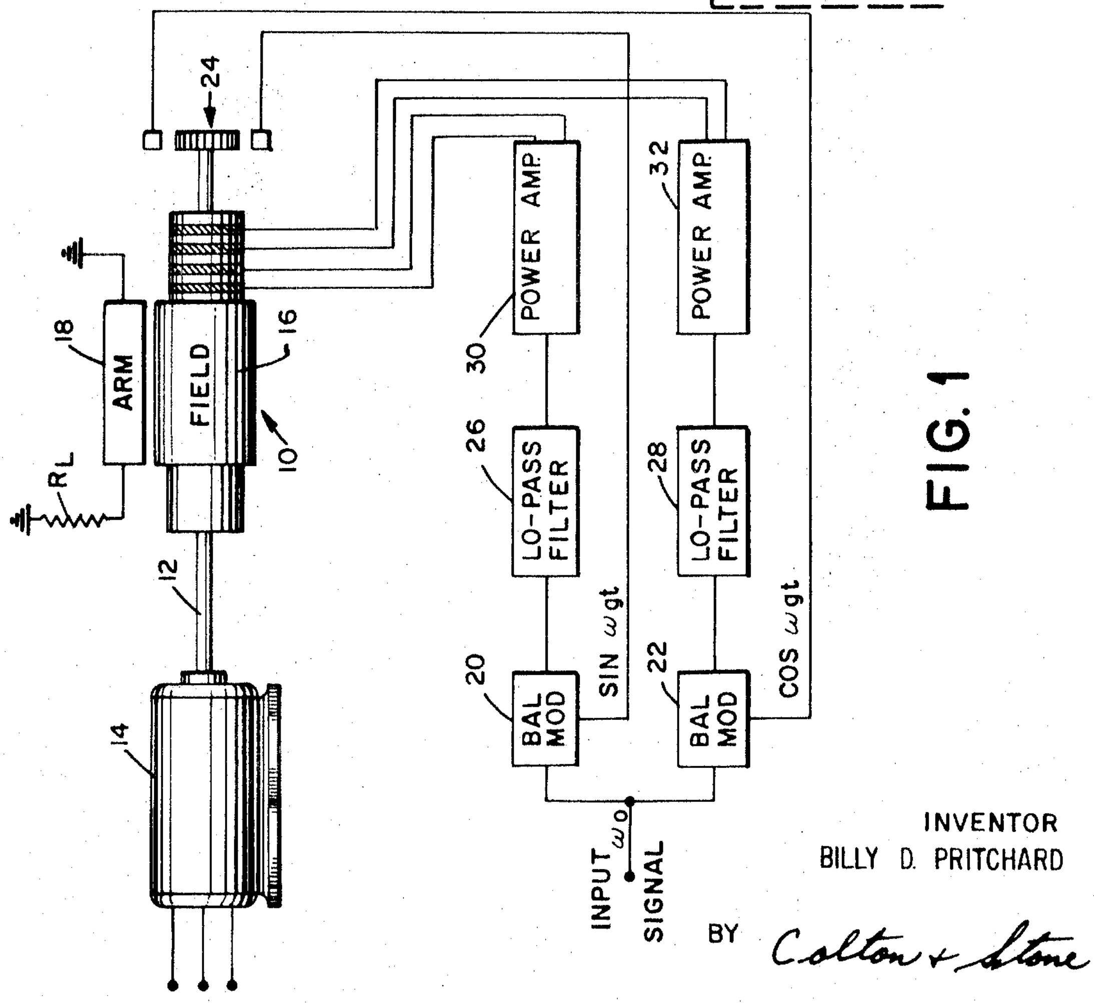
FIG. 1 is a block diagram depicting a first embodiment of the present invention.

In FIG. 1, a VLF alternator is indicated generally at 10. The rotor of alternator 10 is connected to shaft 12 and thus is driven by motor 14. Motor 14 would typically be a 60-cycle, r.p.m. motor; the motor-generator assembly being supported on a base plate which enables proper alignment between the motor and generator to be maintained. While motor 14 is shown as being directly coupled via shaft 12 to alternator 10, a "no brake" drive system may be employed. Such "no brake" drive systems include a flywheel attached to the drive motor output shaft, an internal combustion engine and an eddy current clutch. Accordingly, should the supply or power to the motor 14 be interrupted, alternator drive power may be transferred from the motor to the engine, the flywheel maintaining the alternator shaft rotation during the transition period.

It is especially to be noted that, while the alternator is shown as having a field 16 and an armature 18, in actual practice there will be at least a pair of field windings and a corresponding pair of armature coils. Accordingly, alternator 10 may be a hetropolar inductor alternator in which both the field and the armature windings are located on the stator; the machine being designed to function as two alternators mounted on a single shaft and thus having a two-phase field and a two-phase armature. Alternatively, alternator 10 may be a wound-rotor-type machine with two or more phases; the field coils of the wound rotor machine being physically located on the rotor and the armature windings being located on the stator.

Before proceeding with a description of the main elements of the invention, a brief theoretical discussion of the considerations involved in the stabilization and modulation of a VLF alternator is believed to be in order. The output frequency and voltage of such a machine may be expressed as follows:

$$(1) \qquad f=\frac{(N_s)\,(\text{r.p.m.})}{60}$$

where $N_s$ = number of pole pairs or slots machined in the rotor $$(2) \qquad V=\frac{d\phi}{dt}$$

Considering the case where the alternator is a hetropolar inductor alternator having a two-phase field and a two-phase armature with the field and armature windings being located on the stator, the flux generated in each phase may be represented as follows:

$$(3)\ \Phi_1=\text{Sin}\ \omega g t\times\text{Sin}\ \omega m t$$
$$=\tfrac{1}{2}\text{COS}\ (\omega g-\omega m)t-\tfrac{1}{2}\text{COS}\ (\omega g+\omega m)t$$

where $\omega g$ = frequency of flux generated by shaft rotation and $\omega m$ = frequency of flux generated by field AC current.

Differentiating equation (3) to obtain the voltage from phase one results in:

$$(4)\ V_1=\tfrac{1}{2}(\omega g-\omega m)\text{SIN}\ (\omega g-\omega m)t-\tfrac{1}{2}(\omega g+\omega m)\text{SIN}\ (\omega g+\omega m)\,t$$

The flux and voltage expressions for the second phase may similarly be expressed as follows:

$$(5)\ \Phi=\text{COS}\ \omega g t\times\omega m t$$
$$=\tfrac{1}{2}\text{COS}\ (\omega g+\omega m)t+\tfrac{1}{2}\text{COS}\ (\omega g-\omega m)t$$

and $$(6)\ V_2=\tfrac{1}{2}(\omega g+\omega m)\text{SIN}\ (\omega g+\omega m)t+\tfrac{1}{2}(\omega g+\omega m)\text{SIN}\ (\omega g-\omega m)t$$

In accordance with the present invention, the two phases of the alternator's armature winding will be connected in series. The resultant output voltage impressed across the load, indicated in FIG. 1 as $R_L$, will thus become:

(7) $V_1+V_2=(\omega g-\omega m)\mathrm{SIN}\,(\omega g-\omega m)t$

Equation (7) shows that the amplitude of the output voltage is a function of the rotor frequency $\omega g$ minus the field AC current frequency. Equation (7) also demonstrates that the frequency of the output voltage is displaced from the rotor speed by the field current frequency. Accordingly, in order to accomplish alternator output frequency correction, the alternating current applied to the field windings must have a frequency which is related to the difference between the rotor frequency $\omega g$ and the desired output frequency $\omega o$.

In order to see how frequency correction may be achieved in accordance with the present invention, consider the following:

(8) $\mathrm{SIN}\,(\omega g)t=\mathrm{SIN}\,(\omega o+\omega e)t$

Where:

$\omega 0$ = desired output frequency = reference signal from precision oscillator; and $\omega e$ = difference between the rotor frequency $\omega g$ and the desired output frequency $\omega o$.

The desired output signal may thus be expressed as:

(9) $\mathrm{SIN}\,\omega ot$

By properly combining the input reference signal with a signal commensurate with rotor frequency, the following results may be obtained:

(10) $E_m=\mathrm{SIN}\,(\omega o+\omega e)_t\times\mathrm{SIN}\,\omega ot$ $=\frac{1}{2}\mathrm{COS}\,(\omega o+\omega e-\omega o)t-\frac{1}{2}COS\,(\omega o+\omega e+\omega o)t$ Through proper filtering, equation (10) may be reduced to:

(11) $Em=\frac{1}{2}\mathrm{COS}\,\omega et$

By substituting the frequency terms from equations (8) and (11) into output voltage equation (7), it may be seen that the output voltage may be expressed as follows:

(12) $V_1+V_2=V_T=\omega o\mathrm{SIN}\,\omega ot$

It may be seen therefore that, in order to accomplish frequency shift modulation of the output signal from the alternator, a $\Delta\omega$ term is added to or subtracted from the frequency of the reference signal $\omega o$ and thus will be added to or subtracted from the instantaneous output frequency. It is to be noted that a component also appears in the amplitude term of equation (12). However, if the frequency shift is small compared to the operating frequency, the output voltage amplitude change resulting from the addition or subtraction of a $\Delta\omega$ is insignificant.

Referring again to FIG. 1, a reference signal $\omega o$ from a precision oscillator, not shown, is applied as a first input to a pair of balanced modulators 20 and 22. The signals SIN $\omega gt$ and COS $\omega gt$, applied as the modulating signals to modulators 20 and 22, are obtained from a magnetic sensor unit, indicated generally at 24, mounted on the generator shaft. Sensor unit 24 will, where the alternator has a pair of field windings, be a tachometer generator which provides a two-phase output signal at the generator shaft frequency. Balanced modulators 20 and 22 are state of the art diode mixer circuits which provide a composite output signal commensurate with the sum and the difference of the inputs thereto.

Since, as indicated above, a desired signal for application to the alternator fields is the difference between the input $\omega o$ (desired output frequency) and the rotor frequency $\omega g$, the outputs of modulators 20 and 22 are applied to respective low pass filters 26 and 28. Filters 26 and 28 will remove the sum frequency whereby only the desired difference frequency signals will be applied to respective power amplifiers 30 and 32. The outputs of filters 26 and 28 are, of course, of insufficient amplitude for application to the alternator fields and thus must be amplified.

Figure 2:
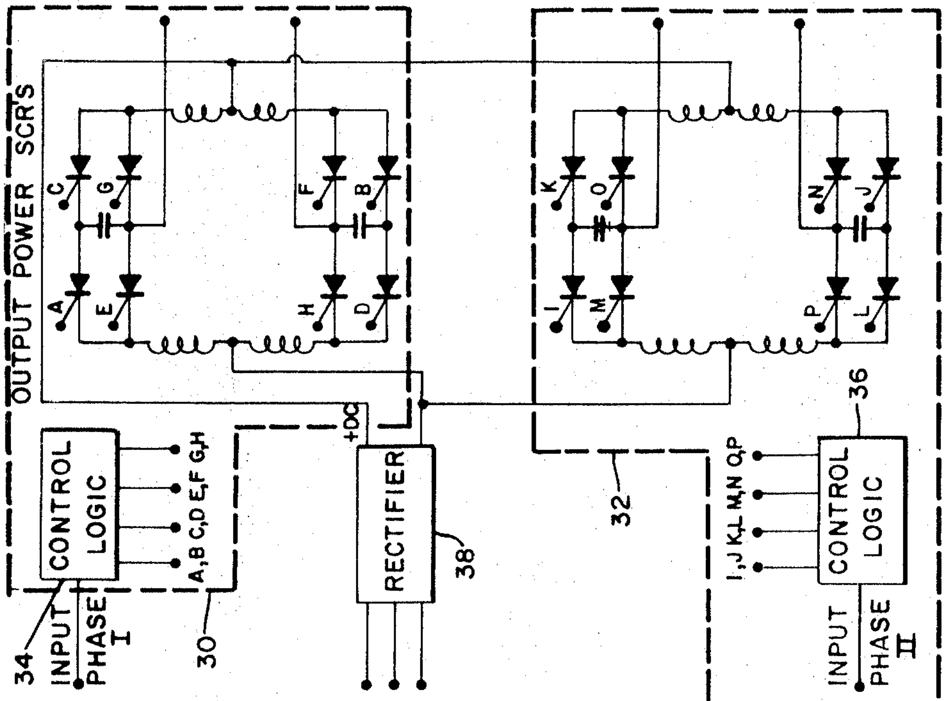
FIG. 2 is a schematic diagram of a power amplifier of a type which may be used in the embodiment of FIG. 1.

Amplifiers 30 and 32 which drive the alternator fields may be of any design as long as they produce the required power and retain the phase and frequency characteristics of the signals received from filters 26 and 28. FIG. 2 depicts the use of SCR-bridge circuits as amplifiers 30 and 32. Through the use of the associated control logic, the power amplifiers operate as pulse width modulators. That is, in response to the input signals from filters 26 and 28, logic circuits 34 and 36 vary the conduction time of the SCR's in the bridge circuits in such a manner as to convert the DC power supplied by rectifier 38, and obtained from a commercial power source which is not shown, to the desired sine wave output signals. Logic circuits 34 and 36 may, for example, each comprise state-of-the-art logic circuitry which converts the sine wave input signals received from the low pass filters into a plurality of pulses. The pulses comprising a first series of these timed pulses are employed to turn the SCR's on and vary in period so as to correspond to the amplitude of the input signal. A second series of timed pulses is also generated. The pulses of this second series are fixed in period and are employed to turn the power SCR's off. The resultant action of the two series of timed pulses is a variation in the on time of the output SCR's whereby a sine wave modulating signal of large amplitude is approximated by current pulses. The frequency and phase of the modulating signals, of course, corresponds to that of the input signals from the filters. Amplifiers 30 and 32 are commercially available devices such as, but not limited to, Model No. 41128–000 "LSi" static frequency converters available from the Power Equipment Division of Lear Siegler, Inc., Cleveland, Ohio, or a "HYBAND" power amplifier available from Inland Controls Company, Boston, Mass. The commercially available "LSi" and "HYBAND" power amplifiers include, as integral solid-state circuitry, control logic circuits 34 and 36 and the associated silicon controlled rectifiers. In addition, the commercially available power amplifiers will each contain its own DC power supply thus eliminating the need for a separate rectifier 38.

The system shown in FIG. 1 has been found to be particularly effective for generating VLF signals in the 10–30 kc. range and with an output power in excess of 200 kw. If it is desired to enhance the output frequency, a frequency multiplier of a type known in the art may be interposed between the series connected armature windings of the alternator and the load $R_L$. It is to be noted that the load will, in the environment of a communications system, comprise an antenna. It is also to be noted that modulation capable of transmitting intelligence would be applied to the alternator output when the system is used as a radio transmitter. The intelligence may be modulated on the alternator output signal by modulating the input signal $\omega o$ prior to application to mixer circuits 20 and 22.

To summarize, in accordance with the present invention, a field modulating frequency that is identical to the difference between the generated signal frequency and the desired output frequency, as provided by a precision internal reference oscillator, is generated and applied to the fields of an alternator. The field modulating frequency provides for correction of the output signal frequency so as to match the output signal frequency with the reference oscillator frequency. In the case of the hetropolar inductor alternator, this frequency correction is achieved by causing the field flux to either rotate with or against the mechanical rotation of the rotor; the correction signal being generated by mixing rotor frequency signals fed back from a rotor shaft tachometer generator with the precision reference signal (either modulated or unmodulated). In the case of the wound rotor alternator, the system functions in the same manner with the exception that the field current is routed through brushes or slip rings located on the rotor and the current flowing through the field windings causes a rotation of the flux in the rotor iron core. Accordingly, it can be seen that the present invention produces the same result as would be achieved from a tuned linear amplifier whose pass band is centered around the alternator shaft frequency.

While a preferred embodiment has been shown and described, various modifications and substitutions may be made thereto without departing from the spirit and scope of the present invention. Accordingly, it is to be understood that the present invention has been described by way of illustration and not limitation.

What is claimed is:

1. An electrical method of stabilizing the output frequency of an alternator comprising the steps of:

providing a reference signal having a frequency commensurate with the desired alternator output frequency;

sensing the actual alternator output frequency and generating signals commensurate therewith, said generated signals having a guadrature phase relationship;

comparing the reference signal with the generated signals and providing a pair of control signals commensurate with the difference in frequency therebetween; and applying said control signals to respective field windings of the alternator to cause the field flux to rotate relative to the mechanical rotation of the alternator rotor.

2. Apparatus for stabilizing the output frequency of an alternator, said alternator having at least a pair of phase related field windings, the frequency stabilization apparatus comprising:

means providing a signal commensurate with desired alternator output frequency;

means for sensing actual alternator output frequency and for generating a pair of quadrature-related signals commensurate therewith;

means responsive to said signal commensurate with desired frequency and to said quadrature-related signals for generating a pair of quadrature-related frequency error signals; and means for applying said frequency error signals to respective field windings of the alternator whereby the field flux will be caused to rotate relative to the rotor rotation to thereby null frequency errors.

3. The apparatus of claim 2 wherein said means for generating frequency error signals comprises:

modulator means.

4. The apparatus of claim 3 wherein said modulator means comprises:

a pair of balanced modulators, each of said modulators being responsive to said desired frequency signals and one of said signals commensurate with actual frequency.

5. The apparatus of claim 4 wherein means for applying the error signals to the alternator field windings comprises:

filter means connected to the output of each of said balanced modulators; and amplifier means connected between each of said filter means and one of said field windings.

6. The apparatus of claim 5 wherein each of said amplifier means comprises:

a solid-state switching circuit; and control means for said switching circuit, said control means being responsive to the signal passed by its associated filter means.

7. The apparatus of claim 6 further comprising:

a source of direct current, said source being periodically connected to said field windings by said switching circuits.

8. Apparatus for generating precisely controlled alternating-current signals for low-frequency communications applications comprising:

an alternator, said alternator having at least a pair of field winding and a pair of armature coils;

prime mover means for driving said alternator;

magnetic sensor means for sensing the speed imparted to said alternator by said prime mover means, said sensor means providing a pair of quadrature related signals commensurate with alternator output frequency;

means providing a signal commensurate with desired alternator output frequency;

balanced modulator means responsive to said quadrature related signals and signal commensurate with desired frequency for generating a pair of quadrature-related frequency error signals;

a source of direct current;

a pair of solid-state switching circuits for coupling said current source to respective of said field windings; and switch control means responsive to said frequency error signals for generating switching signals for said switching circuits whereby signals having approximately a sine wave form at the error frequency will be applied to said field windings and the field flux will be caused to rotate with or against the rotation of the alternator rotor to null output frequency errors.

* * * * *

UNITED STATES PATENT OFFICE
CERTIFICATE OF CORRECTION

Patent No. 3,619,762 Dated November 9, 1971

Inventor(s) Billy D. Pritchard

It is certified that error appears in the above-identified patent and that said Letters Patent are hereby corrected as shown below:

Assignee: Change "Material" to --Materiel--.

Inventor's Name: Change "Pitchard" to --Pritchard--.

Column 1, line 28: Change "is" to --in--.

Column 1, line 30: Change "servo-loop loop" to --servo-loop--.

Column 1, line 44: Change "inerta" to --inertia--.

Column 2, lines 16-17: Change "cycle, r.p.m. motor;" to --cycle, 1800 r.p.m. motor;--.

Column 2, line 24: Change "or" to --of--.

Column 3, line 21: Change "wO" to --wo--.

Signed and sealed this 13th day of June 1972.

(SEAL)
Attest:

EDWARD M.FLETCHER, JR.
Attesting Officer

ROBERT GOTTSCHALK
Commissioner of Patents

)RM PO-1050 (10-69)

USCOMM-DC 60376-P69
U.S. GOVERNMENT PRINTING OFFICE : 1969 O—366-334